United States Patent
Gu et al.

(10) Patent No.: US 8,570,460 B2
(45) Date of Patent: Oct. 29, 2013

(54) ELECTRONICALLY-CONTROLLABLE POLARIZATION INDEPENDENT LIQUID CRYSTAL OPTICAL MEDIUM AND DEVICES USING SAME

(75) Inventors: Mingxia Gu, Beachwood, OH (US); Liubov Kreminska, Kent, OH (US); Andrii Golovin, Kent, OH (US); Oleg D. Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 1381 days.

(21) Appl. No.: 11/641,463

(22) Filed: Dec. 19, 2006

(65) Prior Publication Data

US 2007/0139586 A1 Jun. 21, 2007

Related U.S. Application Data

(60) Provisional application No. 60/751,755, filed on Dec. 19, 2005.

(51) Int. Cl.
*G02F 1/1333* (2006.01)

(52) U.S. Cl.
USPC ................................ 349/88; 349/86; 349/89

(58) Field of Classification Search
USPC ...................................................... 349/86–94
See application file for complete search history.

(56) References Cited

U.S. PATENT DOCUMENTS

| | | | |
|---|---|---|---|
| 5,068,749 A | 11/1991 | Patel | |
| 5,206,747 A * | 4/1993 | Wiley et al. | 349/86 |
| 5,251,048 A * | 10/1993 | Doane et al. | 345/87 |
| 5,384,067 A * | 1/1995 | Doane et al. | 349/183 |
| 5,973,817 A | 10/1999 | Robinson | |
| 5,978,053 A | 11/1999 | Giles et al. | |
| 6,259,506 B1 | 7/2001 | Lawandy | |
| 6,266,109 B1 * | 7/2001 | Yamaguchi et al. | 349/86 |
| 6,452,651 B1 * | 9/2002 | Takami et al. | 349/88 |
| 6,522,467 B1 | 2/2003 | Li et al. | |
| 6,529,676 B2 | 3/2003 | Eggleton et al. | |
| 6,606,181 B2 | 8/2003 | Patel et al. | |
| 6,667,824 B2 | 12/2003 | Bayart et al. | |
| 7,079,203 B1 | 7/2006 | Huang | |
| 7,408,601 B1 * | 8/2008 | Huang et al. | 349/95 |
| 2001/0001569 A1 * | 5/2001 | Lawandy | 349/193 |
| 2002/0054251 A1 * | 5/2002 | Maruyama et al. | 349/88 |
| 2002/0130989 A1 * | 9/2002 | Nakao et al. | 349/86 |
| 2004/0155997 A1 | 8/2004 | West et al. | |
| 2005/0146655 A1 * | 7/2005 | Barge et al. | 349/86 |
| 2005/0162585 A1 | 7/2005 | Komitov et al. | |
| 2005/0270441 A1 | 12/2005 | Chari et al. | |

OTHER PUBLICATIONS

Lin et al. "Polarization-independent and fast-response phase modulation using a normal-mode polymer-stabilized cholesteric texture." Journal of Applied Physics 98, 043112 (2005).*

* cited by examiner

*Primary Examiner* — Jessica M Merlin
(74) *Attorney, Agent, or Firm* — Fay Sharpe LLP (57) ABSTRACT

A liquid crystalline optical medium includes polymer stabilized liquid crystal material. The polymer stabilized liquid crystal material includes a short pitch cholesteric liquid crystal material stabilized by a polymer material. The effective phase retardation of the polarization independent liquid crystal optical medium can be controlled by external (for example, electric and magnetic) fields.

20 Claims, 10 Drawing Sheets

Fig. 9

ELECTRONICALLY-CONTROLLABLE POLARIZATION INDEPENDENT LIQUID CRYSTAL OPTICAL MEDIUM AND DEVICES USING SAME

This application claims the benefit of U.S. Provisional Application Ser. No. 60/751,755 filed on Dec. 19, 2005. U.S. Provisional Application Ser. No. 60/751,755 filed on Dec. 19, 2005 is incorporated by reference herein in its entirety.

This invention was made with Government support under NASA grant no. NAG3-2539 awarded by the National Aeronautics and Space Administration (NASA). The Government has certain rights in this invention.

BACKGROUND

The following relates to the optical arts. It especially relates to polarization independent liquid crystal optical media and to applications of same such as optical modulators and to wavefront correctors employing said polarization independent optical media, and will be described with particular reference thereto. However, the following will find application generally wherever a polarization-independent liquid crystal optical medium is advantageously applied, such as optical modulators, optical devices generally that employ phase modulation of light, in adaptive telescopes, in telecommunications applications, as a lasing system when doped with an appropriate dye, and so forth.

Polarization independent phase modulating optical media have heretofore been manufactured from polymer-dispersed liquid crystal (PDLC) material, in which droplets of nematic liquid crystal material are dispersed within a polymer matrix. A polymer concentration of about 30 wt-% or higher is generally used to provide spatially isolated liquid crystal droplets of typically several microns or less in size. Phase modulators made with these PDLC-based polarization independent optical materials have typically exhibited low effective refractive index changes between the "off" and "on" states, have required high switching voltages of around 15 volts/micron or higher, and have exhibited relatively low switching speeds.

It is believed that the relatively poor performance of these PDLC-based optical materials may be related in part to the high polymer concentration defining the polymer matrix. However, reducing the polymer concentration typically results in larger nematic liquid crystal droplets, and the larger liquid crystal droplets may result in polarization dependence. Such larger liquid crystal droplets also can degrade modulator performance.

The following provides improved apparatuses and methods that overcome the above-mentioned limitations and others.

BRIEF SUMMARY

According to one aspect, a polarization independent liquid crystalline optical medium is disclosed, including a polymer-stabilized liquid crystal material including a substantially randomly oriented short pitch cholesteric liquid crystal material stabilized by a polymer material.

According to one aspect, a polarization independent liquid crystalline optical medium is disclosed, including a polymer-stabilized liquid crystal material including a substantially randomly oriented short pitch cholesteric liquid crystal material stabilized by a polymer material. A concentration of the polymer material in the polymer-stabilized liquid crystal material and a highly twisted structure of the short-pitch cholesteric liquid crystal material cooperatively cause the optical medium to interact with light at least at a selected wavelength in a substantially polarization-independent manner.

According to another aspect, a phase modulator is disclosed. A liquid crystalline optical medium comprises a polymer-stabilized liquid crystal material including a substantially randomly oriented short-pitch cholesteric liquid crystal material stabilized by a polymer material. A concentration of the polymer material in the polymer stabilized liquid crystal material and a highly twisted structure of the short pitch cholesteric liquid crystal material cooperatively cause the optical medium to produce a substantially polarization independent retardation of at least light having a selected wavelength.

According to another aspect, a wavefront corrector is disclosed. A phase modulator includes polymer stabilized liquid crystal material contained in an optical cell. The polarization independent liquid crystal optical medium includes a short pitch cholesteric liquid crystal material stabilized by a matrix of polymer material. The optical cell includes electrodes for selectively applying a voltage across the polymer stabilized liquid crystal material. At least one of the electrodes of the optical cell is an addressable electrode configured to apply voltage across the polymer-stabilized liquid crystal material that is spatially variable over a principal face of the optical cell to effectuate a wavefront correction.

According to another aspect, a method is disclosed for forming a phase modulator. A polarization independent liquid crystal optical medium including a short pitch cholesteric liquid crystal material stabilized by a matrix of polymer material is disposed in an optical cell that includes electrodes for selectively applying a voltage across the polymer stabilized liquid crystal material.

According to another aspect, a lasing device is disclosed. A liquid crystalline optical medium includes a polymer-stabilized liquid crystal material including a substantially randomly oriented short-pitch cholesteric liquid crystal material stabilized by a polymer material. A laser dye dopes said liquid crystalline optical medium.

Numerous advantages and benefits will become apparent to those of ordinary skill in the art upon reading and understanding the present specification.

DETAILED DESCRIPTION OF PREFERRED EMBODIMENTS

Figure 1:
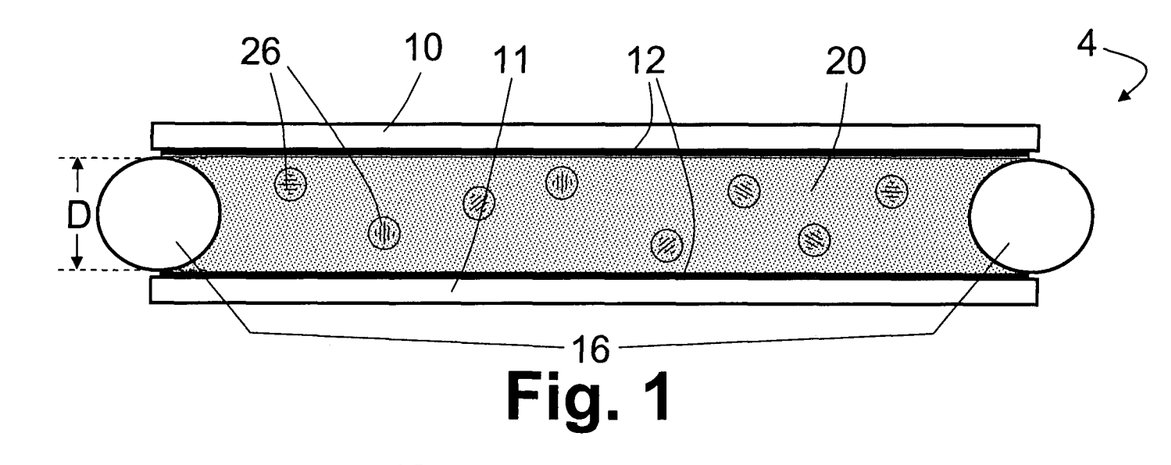
FIG. 1 diagrammatically shows a polarization independent phase modulator device.
Figure 2:
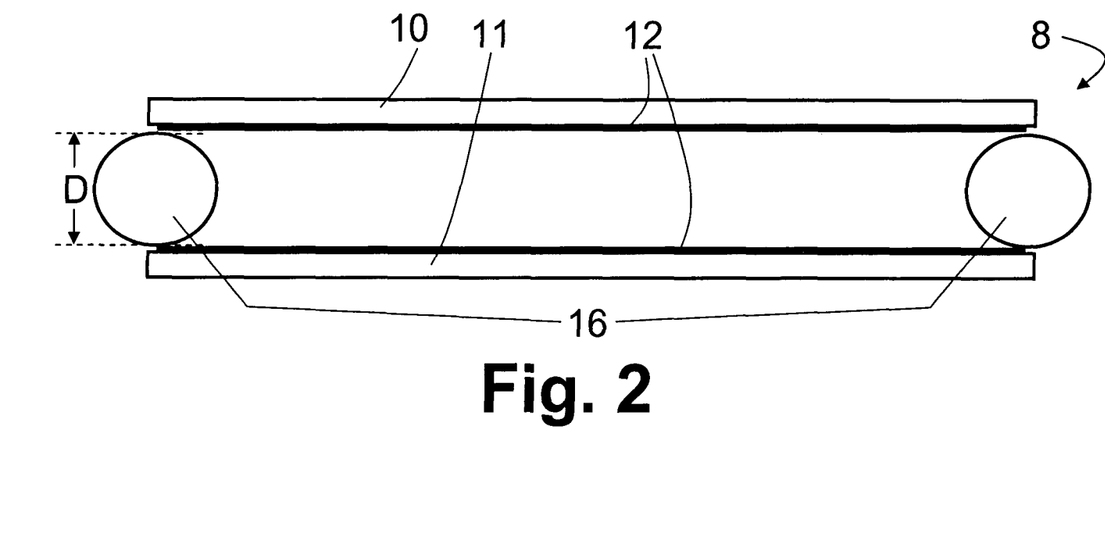
FIG. 2 diagrammatically shows the optical cell of the phase modulator of FIG. 1 without the polymer-stabilized cholesteric liquid crystal material.
Figure 3:
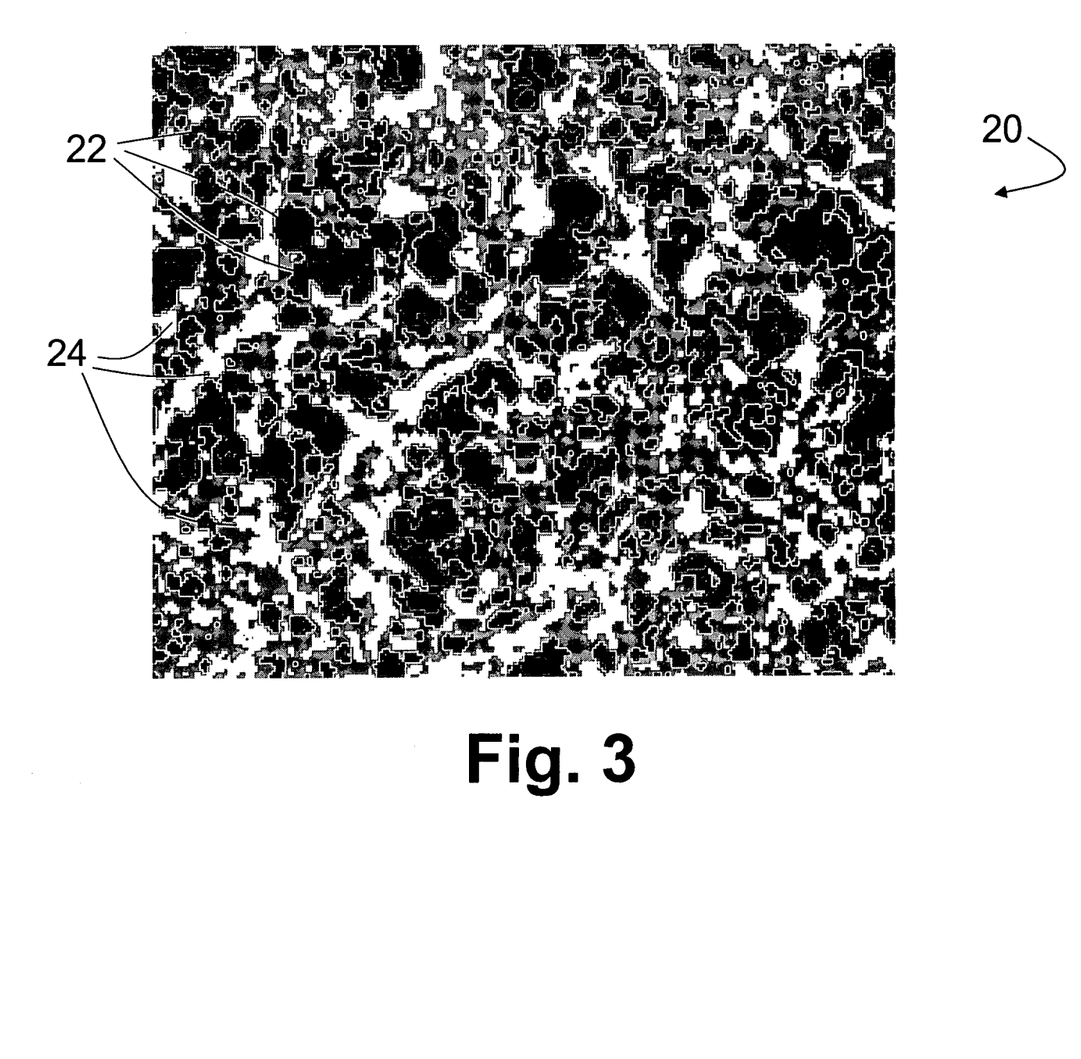
FIG. 3 diagrammatically shows a portion of the polymer-stabilized cholesteric liquid crystal material of the modulator device of FIG. 1.

With reference to FIGS. 1-3, a phase modulator 4 includes an optical cell 8 defined by spaced-apart substrates 10, 11 having electrodes 12 disposed on inner surfaces thereof. The substrates 10, 11 are spaced apart by separators 16 disposed between the substrates. In the illustrated embodiment, the separators 16 are glass fibers; however, other intervening separators can be used. The separators 16 define a cell gap D between the spaced-apart substrates 10, 11. In some embodiments, the optical cell 8 is a reflective cell in which one substrate 10 is light-transmissive while the other substrate 11 is light-reflective. In other embodiments, the optical cell is a transmissive cell in which both substrates 10, 11 are light-transmissive. Light transmissive electrodes should be used in conjunction with light transmissive substrates. For example, light transmissive indium tin oxide (ITO) electrodes can be used. Electrodes on a reflective substrate can be either light transmissive or opaque.

The optical cell 8 contains a polymer-stabilized liquid crystal material 20 disposed in the gap between the spaced-apart substrates 10, 11. The polymer-stabilized liquid crystal material 20 includes a short-pitch cholesteric liquid crystal material 22 stabilized by a polymer material 24. A concentration of the polymer material 24 in the polymer-stabilized liquid crystal material 20 and a highly twisted structure of the short-pitch cholesteric liquid crystal material 22 cooperatively cause the optical medium to interact with light at least at a selected wavelength in a substantially polarization-independent manner, thus causing the phase modulator 4 to produce a substantially polarization-independent phase retardation of light of a selected wavelength or wavelength range under influence of a voltage applied by the electrodes 12. The concentration of the polymer material 24 in the polymer-stabilized liquid crystal material 20 is preferably low so as to reduce the applied voltage sufficient to produce phase retardation. In some embodiments, the polymer material 24 is less than about 25 wt-% of the polymer-stabilized liquid crystal material 20. In some embodiments, the polymer material 24 is less than about 10 wt-% of the polymer-stabilized liquid crystal material 20. In some embodiments, the polymer material 24 is between about 5 wt-% and about 25 wt-% of the polymer-stabilized liquid crystal material 20.

It has been found that for the short-pitch cholesteric liquid crystal material 22, a concentration of polymer material 24 in the polymer-stabilized liquid crystal material 20 of about 5 wt-% produces the polymer-stabilized liquid crystal material 20 with the short-pitch cholesteric liquid crystal material 22 existing as interconnected domains 26 having an average size of about one micron in the matrix of polymer material 24. (Domains 26 are indicated diagrammatically in FIG. 1, but are not drawn to scale). In contrast, a concentration of polymer material of about 30 wt-% or higher has typically been used to produce micron-sized nematic liquid crystal droplets. Without being limited to any particular theory of operation, it is believed that the director rotation of the cholesteric liquid crystal material 22 promotes formation of domains 26 of smaller size, and substantially randomizes the optical properties.

In some embodiments employing 5 wt-% polymer material, the phase modulator 4 provides a change in phase retardation of at least $0.5\pi$ corresponding to a change in applied voltage of less than 10 volts/micron. The short-pitch cholesteric liquid crystal material 22 typically has a pitch of less than 500 nm which has been found to provide substantially polarization independent phase retardation for a suitable corresponding concentration of the polymer material 24 in the polymer-stabilized liquid crystal material 20. The pitch and concentration of polymer material are suitably optimized by trial-and-error to provide substantially polarization independent phase retardation.

Although not illustrated, an alignment layer is optionally provided on one or both inner principal surfaces of the substrates 10, 11, to promote a selected initial alignment of the short-pitch cholesteric liquid crystal material 22.

A suitable method for manufacturing phase modulators in accordance with design approaches set forth herein includes injecting a cholesteric liquid crystal material into an optical cell. The cholesteric liquid crystal material can be a chiral liquid crystal material, a nematic liquid crystal material with a dispersed chiral dopant, or so forth. In the latter case, a ratio of the nematic liquid crystal material and the chiral dopant may be relatively large, and in some contemplated embodiments greater than 8:1, with the relatively small amount of chiral dopant being sufficient to provide a liquid crystal material having short-pitch cholesteric characteristics. The optical cell optionally has one or more alignment materials or layers disposed on one or both inner principal surfaces to establish a desired initial alignment of liquid crystal. A small amount of polymer is added, or a pre-polymer is added and cured or polymerized to form the polymer. In some contemplated embodiments, the polymer or pre-polymer is injected into the optical cell first, followed by injection of the cholesteric liquid crystal material. In the case of a cholesteric liquid crystal material made of a nematic liquid crystal material with a dispersed chiral dopant, substantial miscibility of the chiral dopant and polymer in the nematic host is advantageous for long-term device stability.

An illustrative example embodiment of the phase modulator 4 actually constructed in accordance with design approaches set forth herein is described.

The actually constructed phase modulator included a homeotropic cell in which top and bottom substrates were both coated with SE7511L (available from Nissan Chemicals, which has a U.S. office in Houston, Tex.) and were maintained at a cell gap D of 7 microns by glass fiber separators. The short-pitch cholesteric liquid crystal material was a mixture of 92.6% nematic liquid crystal E7 (available from Merck & Co., Whitehouse Station, N.J.) and 7.4% chiral dopant R1011 (available from Merck). The chiral pitch was around 350 nm as determined by measuring the reflection band of a cell with planar boundary conditions filled with this cholesteric liquid crystal material. The matrix of polymer material was derived from a pre-polymer, namely monomer RM82 (available from Merck) with a photoinitiator, namely Irgacure 651 (available from Ciba Specialty Chemicals, which has a U.S. office in Tarrytown, N.Y.). The RM82 monomer was 5% of the mixture forming the polymer-stabilized liquid crystal material, while the Iracure 651 photoinitiator was 0.24% of the mixture forming the polymer-stabilized liquid crystal material. The mixture was cured under ultraviolet light with an intensity of 40 mW/cm$^2$ for 30 minutes while the cell was placed on a hot stage with a temperature of 78° C. keeping the mixture in an isotropic phase.

Figure 4:
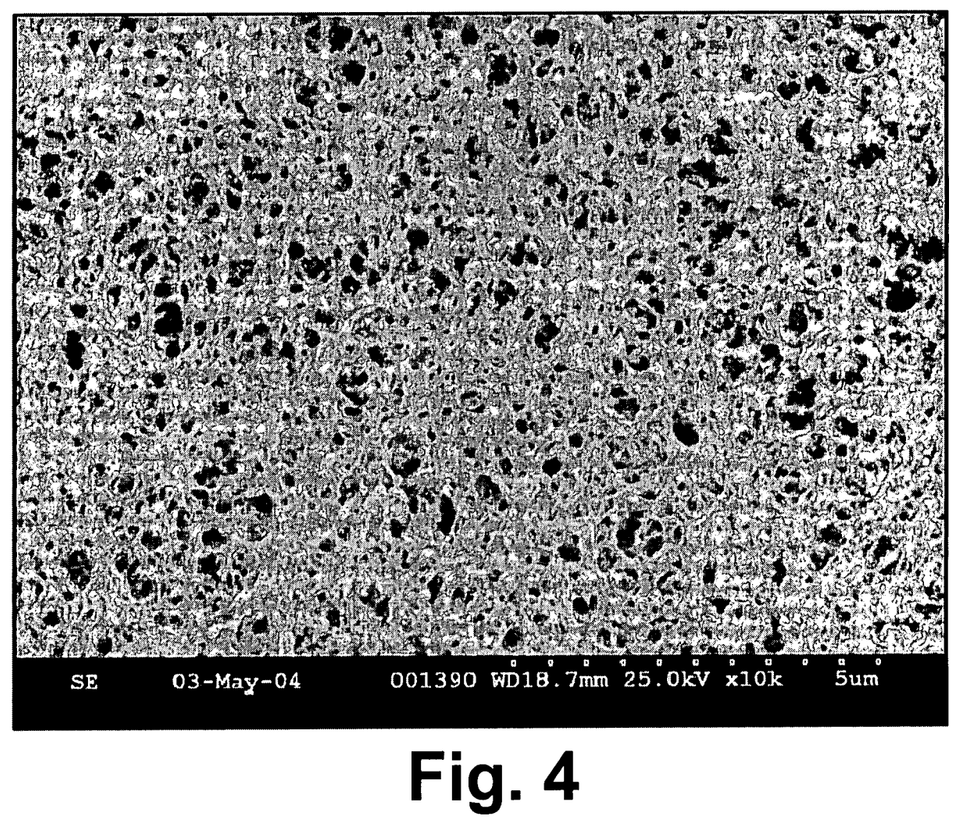
FIG. 4 is a scanning electron microscope (SEM) image of the texture of the polymer-stabilized cholesteric liquid crystal material of the modulator device.

FIG. 4 shows an example of a scanning electron microscope (SEM) image of the texture of the polymer network acquired during SEM studies of the actually constructed embodiment of the phase modulator 4. Domains of small size were formed after polymerization. The average domain size was observed to be around one micron. These small domain sizes were achieved for a low polymer concentration of 5 wt-%.

Figure 5A:
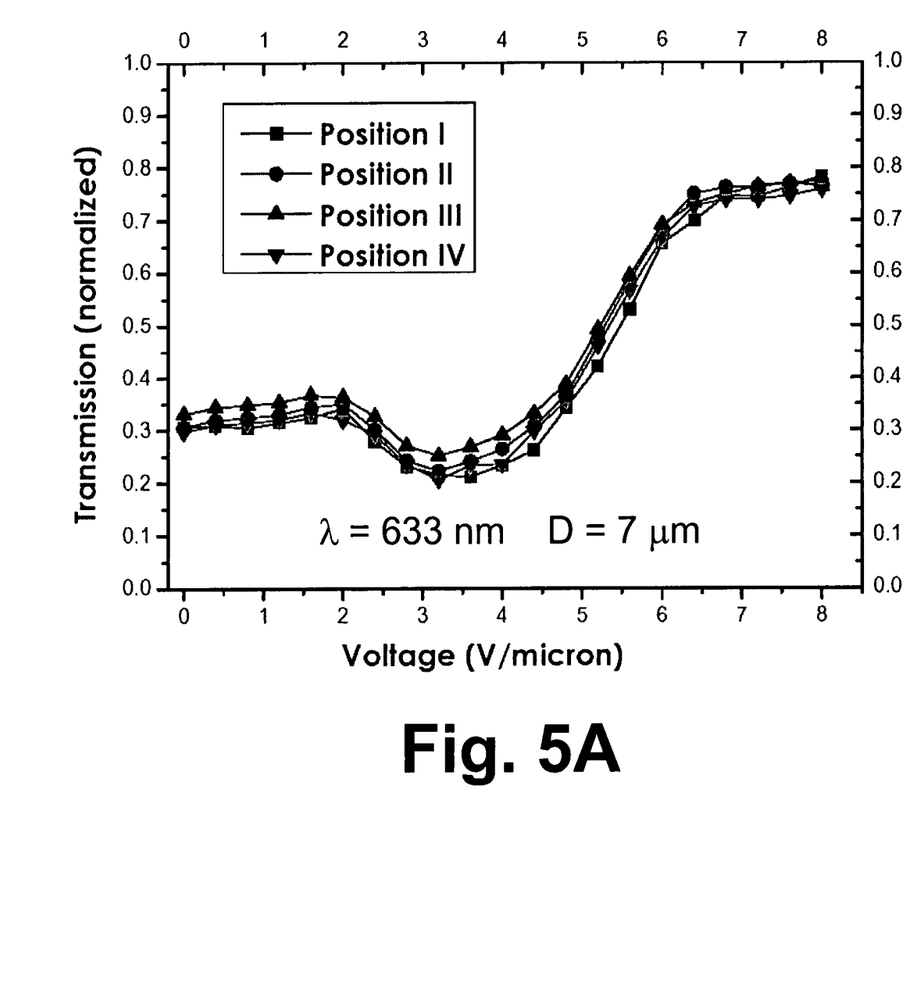
FIGS. 5A and 5B plot transmission versus voltage applied across the modulator at four different positions of a polarizer for wavelengths of 633 nm and 1.55 micron, respectively. The polarizer positions correspond to 0°, 45°, 90°, and 135°.
Figure 5B:
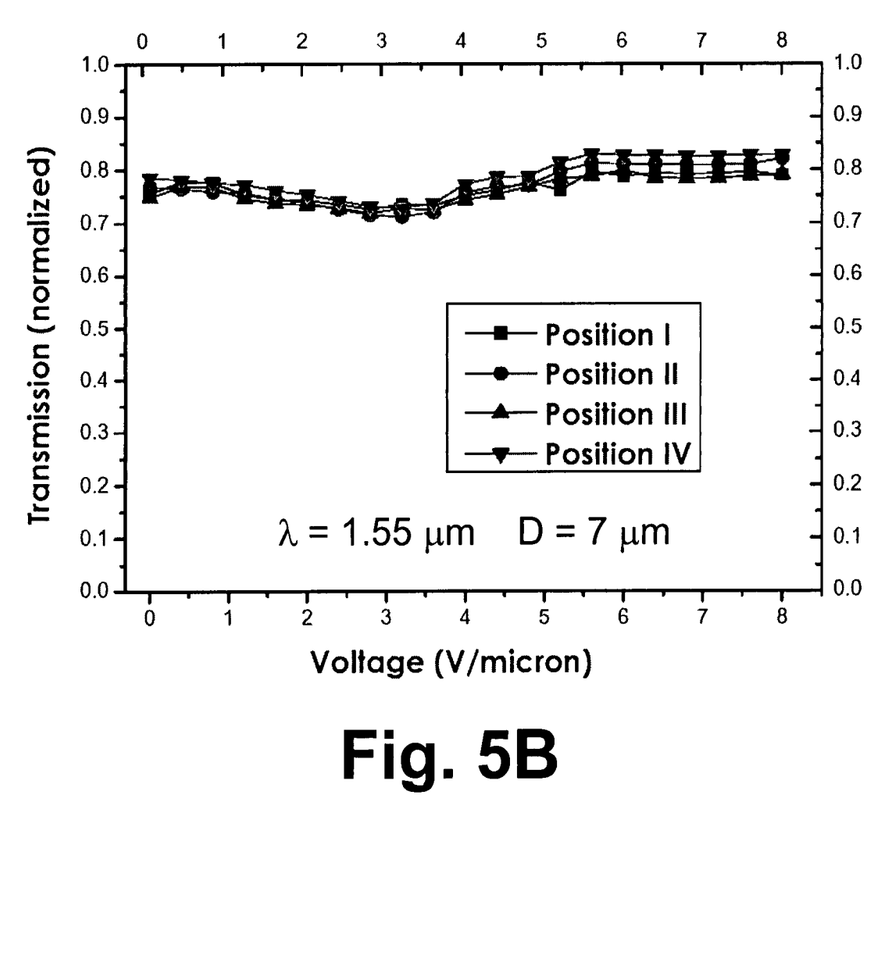

FIGS. 5A and 5B plot measurements of polarized light transmission intensity vs. applied voltage across the phase modulator for light having a wavelength of 633 nm (FIG. 5A, corresponding to visible light) and for light having a wavelength of 1.55 micron (FIG. 5B, corresponding to infrared light). It is to be understood that as used herein, the term "light" is to be broadly construed as encompassing both visible light and "invisible" light such as infrared light, ultraviolet light, and so forth. As seen in FIG. 5A, strong light intensity modulation was observed as a function of applied voltage for the light at 633 nm. As seen in FIG. 5B, the light transmission intensity was substantially independent of applied voltage for the light at 1.55 micron. The observed voltage dependence of light transmission intensity at 633 nm is believed to have been due to light scattering, because the 633 nm wavelength is shorter than the average domain size of about one micron (see FIG. 4). In contrast, the 1.55 micron wavelength is substantially longer than the average domain size of about one micron, leading to the observed substantially reduced scattering at 1.55 micron and light transmission intensity that was substantially voltage independent. The substantially voltage-independent light transmission at 1.55 micron enables the modulator to provide substantially phase-only modulation at 1.55 micron. For light at both 633 nm and 1.55 micron, the light transmission intensity was substantially independent of polarization of applied light.

Figure 6:
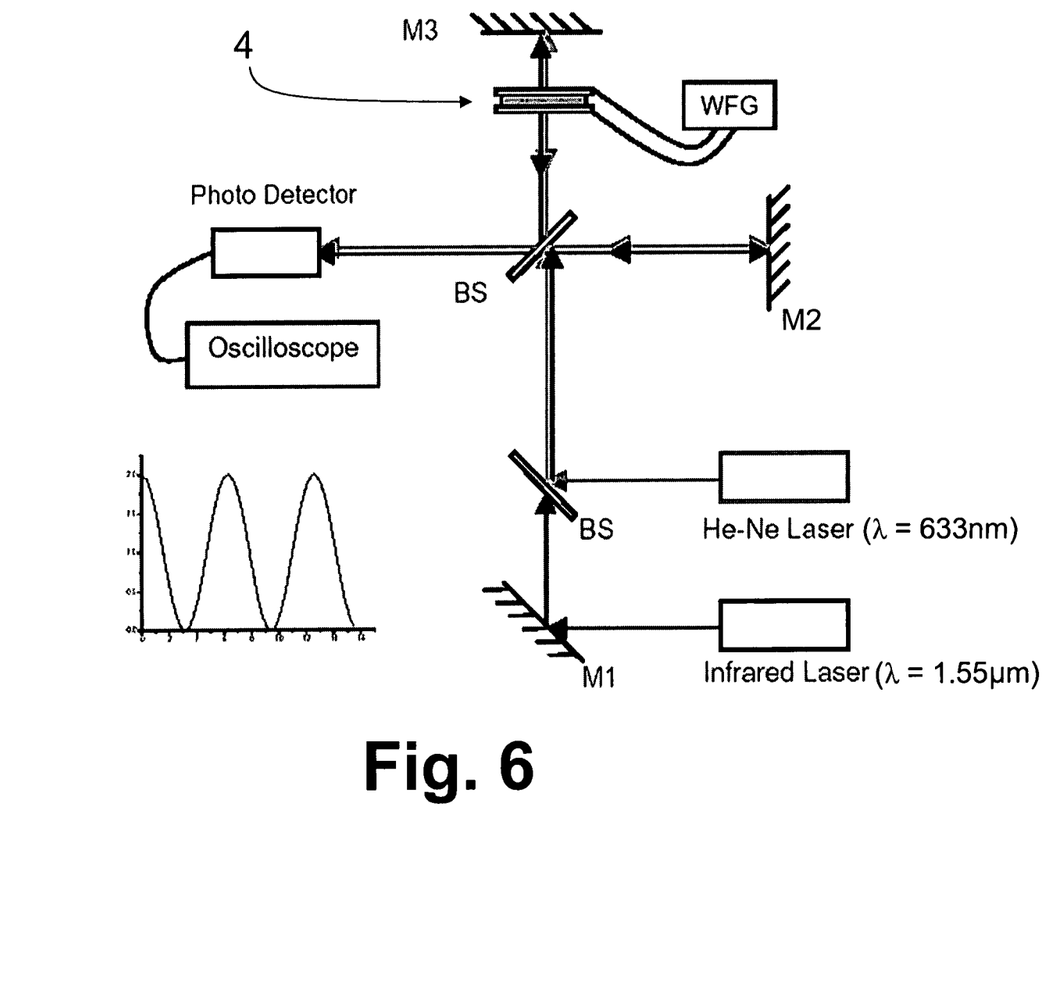
FIG. 6 diagrammatically shows a Michelson interferometer optical setup used to measure the phase retardation of the modulator device.

FIG. 6 diagrammatically shows a Michelson interferometer optical setup that was used to measure phase retardation of the actually constructed embodiment of the modulator device 4. In FIG. 6, the following symbols are used: "M1", "M2" and "M3" denote mirrors; "BS" denotes a beam-splitter; and "WFG" denotes a waveform generator for applying voltage to the electrodes of the phase modulator 4. Phase retardation measurements were performed principally using the InGaAsP infrared laser that outputs at 1.55 micron wavelength, for which wavelength the phase modulator 4 exhibited substantially phase-only modulation in the actually constructed embodiment described herein. The helium-neon (HeNe) laser outputs at 633 nm, and was used principally for optical alignment of the Michelson interferometer.

Figure 7:
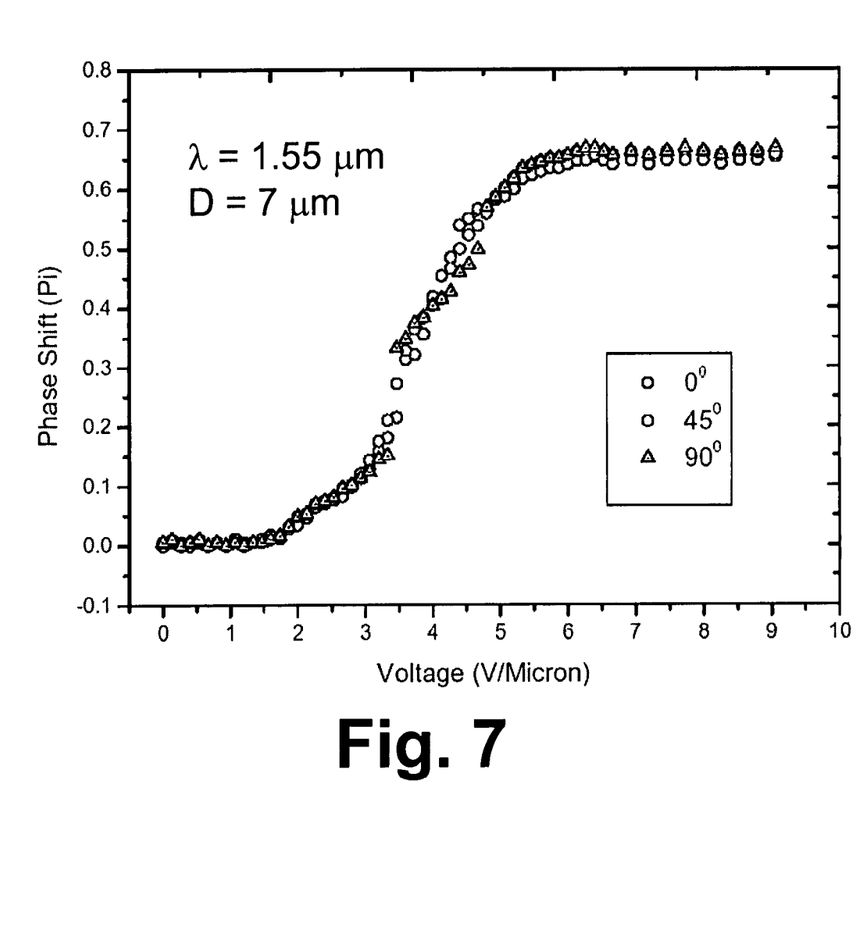
FIG. 7 plots phase shift in units of Pi ($\pi$) across the modulator device for light at 1.55 µm at three different incoming light polarizations.

FIG. 7 plots the observed phase shift in units of Pi ($\pi$) across the 7-micron thick modulator device for light at 1.55 micron at three different incoming light polarizations: 0°, 45°, and 90°. These measurements were done using the Michelson interferometer diagrammatically shown in FIG. 6. A phase retardation of about $0.65\pi$ was observed for an applied voltage of 7.5 V/micron.

According to a simple model, a 7-micron-thick optical cell when filled with randomly oriented short-pitch cholesteric liquid crystal material described previously should give:

$$2\pi \frac{(\bar{n} - n_o) \cdot D \cdot C}{\lambda} = 2\pi \frac{\Delta n \cdot D \cdot C}{\lambda} \sim 0.67\pi, \quad (1)$$

where, $\bar{n}$ denotes the average refractive index of the liquid crystal, $n_o$ is the ordinary refractive index of the liquid crystal, $\lambda$ is the wavelength of the light, $\Delta n$ denotes the refractive index change responsive to applied voltage, D denotes the cell gap D as labeled in FIG. 1, and C denotes the concentration of short-pitch cholesteric liquid crystal material 22 in the polymer stabilized liquid crystal material 20. Considering that the applied voltage cannot completely switch the cell into a homeotropic state, and recognizing the existence of polymer refractive index mismatching from the average refractive index of the liquid crystal, the results plotted in FIG. 7 ($0.65\pi$ phase retardation for an applied voltage of 7.5 V/micron for the 7-micron-thick optical cell) and the predicted phase retardation of the model of Equation (1) ($0.67\pi$) are in good agreement.

With continuing reference to FIG. 7, substantial polarization independence of the actually constructed embodiment of the phase modulator 4 was observed. The cell was rotated during the measurement under different voltages. The rotation axis was normal to the principal surface or face of the cell and parallel to the direction of incident light. During the rotation, no phase retardation dependence was detected. The phase retardation did not change at different cell orientations, evidencing that the phase retardation is polarization independent. FIG. 7 plots the observed phase shifts acquired at three different incoming light polarizations (0°, 45°, and 90°). The observed phase shifts are substantially the same at these three different light polarizations, evidencing substantial polarization independence of the actually constructed embodiment of the phase modulator 4. Without being limited to any particular theory of operation, it is believed that the typical substantial randomness of the domains is the principle cause of the polarization independence.

Figure 8A:
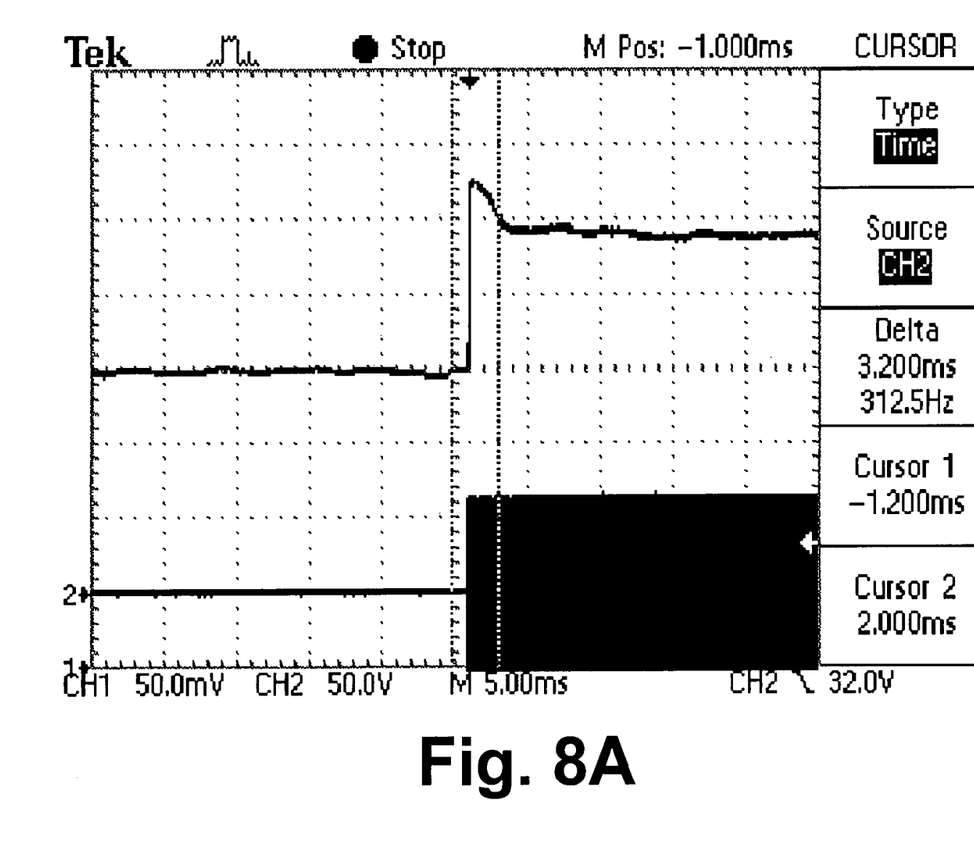
FIGS. 8A and 8B plot response time of switching 0.65% phase at a square-wave applied voltage of 7.5 V/μm and a frequency of 1 kHz.
Figure 8B:
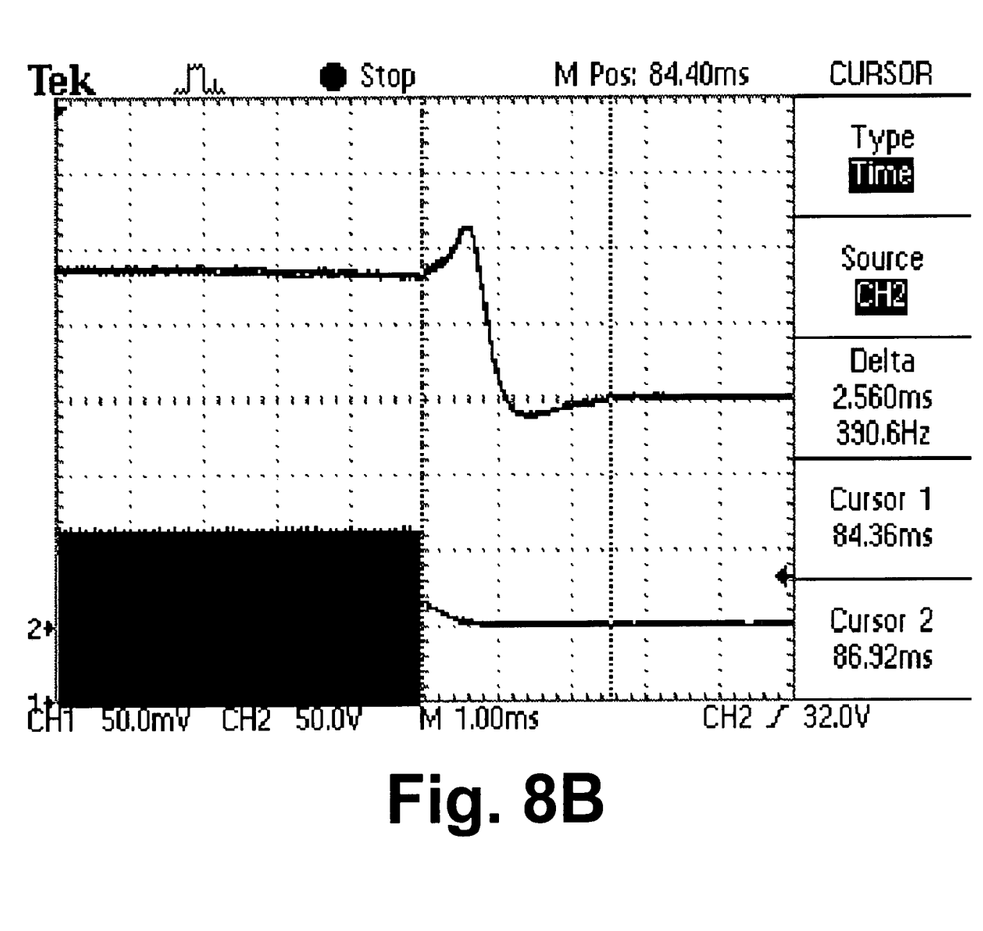

With reference to FIGS. 8A and 8B, measurements were also made of the switching speed of the device. It was observed that to switch the phase by $0.65\pi$, the "switch-on" time and the "switch-off" time is around four milliseconds and three milliseconds, respectively, when a 7.5 V/micron, 1 kHz square-wave voltage is applied on the cell.

The disclosed modulator devices are applicable in a wide range of applications that call for phase retardation or phase shifting of light without concomitant intensity modulation.

Figure 9:
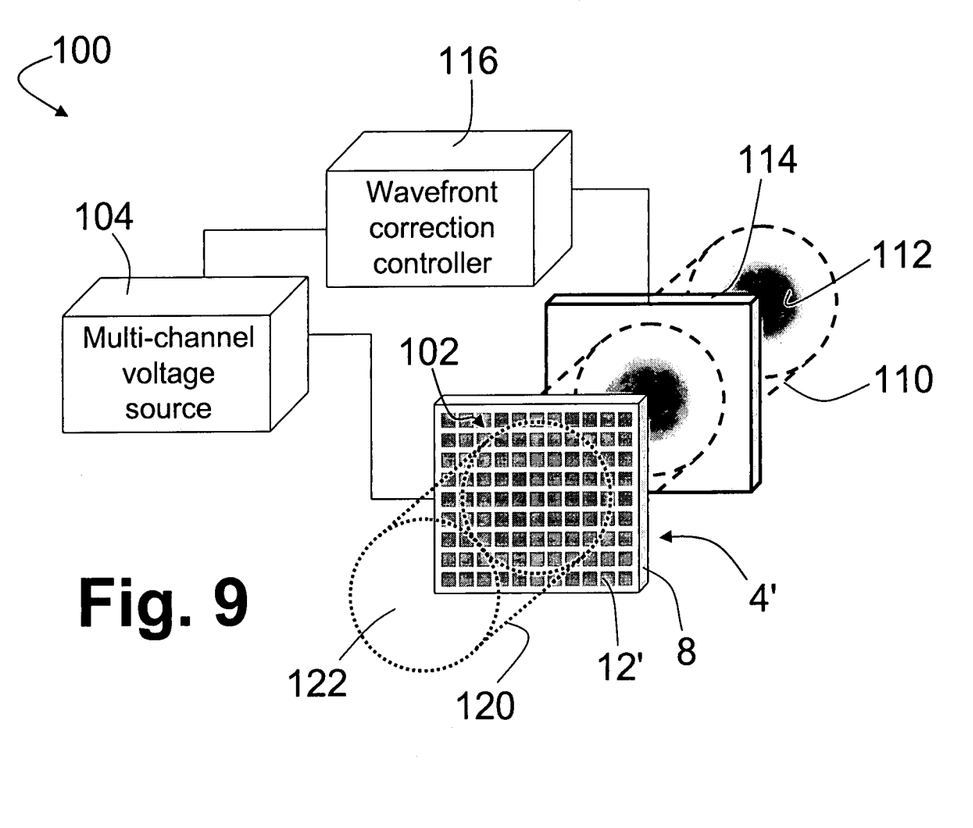
FIG. 9 diagrammatically shows a wavefront corrector based on a modified version of the modulator device of FIG. 1 that includes at least one addressable electrode.

FIG. 9 diagrammatically shows one such application, namely a wavefront corrector 100 based on a modified modulator device 4'. The modified modulator device 4' is substantially similar to the modulator device 4 of FIGS. 1-3, except that the modulator device 4' includes at least one addressable electrode 12' configured to apply voltage across the polymer-stabilized liquid crystal material 20 that is spatially variable over a principal face 102 of the optical cell 8 to effectuate a wavefront correction. In the embodiment illustrated in FIG. 9, the addressable electrode 12' is a pixelated electrode having a two-dimensional array of electrode pixels distributed across the principal face 102 of the optical cell 8. A multi-channel voltage source 104 is configured to apply spatially varied voltage to the addressable electrode 12' so as to effectuate wavefront correction. For example, each channel of the voltage source 104 can apply voltage to a corresponding pixel or group of pixels of the addressable electrode 12'.

An incoming light beam 110 (diagrammatically illustrated using dashed lines) has a wavefront 112 with a wavefront error, such as a phase distortion that varies spatially across the wavefront 112 (phase distortion diagrammatically indicated by shading). A wavefront analyzer 114 is arranged to measure the wavefront 112 of the incoming light beam 110. The wavefront analyzer 114 determines the wavefront error based on the measurement of the wavefront 112. A wavefront correction controller 116 determines voltages to be applied to the addressable electrode 12' of the phase modulator 4' by the voltage source 104 so as to cause the phase modulator 4' to correct the wavefront error to produce a corrected outgoing light beam 120 (diagrammatically illustrated using dotted lines) having a substantially uniform wavefront 122 (uniformity of the wavefront 122 is diagrammatically indicated by lack of shading of the wavefront 122).

In some embodiments, the wavefront error is known a priori, for example based on a wavefront distortion known to be produced by a given lens. In such embodiments, the wavefront analyzer 112 and wavefront correction controller 116 are optionally omitted, and the voltage source 104 is permanently configured to produce voltages applied to the addressable electrode 12' so as to correct the a priori known wavefront error.

The wavefront corrector 100 illustrated in FIG. 9 employs the light-transmissive phase modulator 4'. The skilled artisan can readily construct corresponding wavefront correctors employing a reflective phase modulator in which one of the two substrates is transparent and the other of the two substrates is reflective. In such embodiments, the transparent substrate both receives input light and outputs the wavefront-corrected light after reflection off the reflective substrate.

The polarization independent liquid crystal media disclosed herein have numerous applications besides the illustrated example phase modulator and wavefront corrector applications. For example, another application of the polarization independent liquid crystal media disclosed herein is random lasing when the medium is doped with an appropriate laser dye to provide a gain medium. The multiple random scattering between domains can serve as the feedback to achieve gain.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An optical device comprising:
   a light source;
   an optical cell arranged to receive light from the light source, the optical cell containing a polymer-stabilized liquid crystal material including a substantially randomly oriented short-pitch cholesteric liquid crystal material having a pitch of less than 500 nm stabilized by a polymer material wherein (i) a concentration of the polymer material in the polymer-stabilized liquid crystal material and (ii) a highly twisted structure of the randomly oriented short-pitch cholesteric liquid crystal material cause the optical medium to interact with light received from the light source in a substantially polarization-independent manner and wherein the polymer material is less than about 25 wt-% of the polymer-stabilized liquid crystal material, the optical cell including electrodes for selectively applying a voltage across the polymer-stabilized liquid crystalline optical material; and
   a voltage source arranged to apply voltage to the electrodes over an operative voltage range wherein the optical cell provides polarization-independent phase retardation as a function of voltage over the operative voltage range, the operative voltage range being not sufficient to switch the optical cell into a homeotropic state, the randomly oriented short-pitch cholesteric liquid crystal material remaining randomly oriented over the operative voltage range.

2. The optical device as set forth in claim 1, wherein the polymer material is less than about 10 wt-% of the polymer-stabilized liquid crystal material.

3. The optical device as set forth in claim 1, wherein the polymer material is between about 5 wt-% and about 25 wt-% of the polymer-stabilized liquid crystal material.

4. The optical device as set forth in claim 1, wherein the short-pitch polymer-stabilized cholesteric liquid crystal material comprises:
   a nematic liquid crystal material; and
   a chiral dopant dispersed in the nematic liquid crystal material.

5. The optical device as set forth in claim 4, wherein a weight ratio of the nematic liquid crystal material and the chiral dopant is greater than 8:1.

6. The optical device as set forth in claim 1, further comprising:
   a laser dye doping said polymer-stabilized liquid crystalline optical medium such that said polymer-stabilized liquid crystalline optical medium is a gain medium suitable for use in a lasing device.

7. The optical device as set forth in claim 1, wherein the optical cell provides polarization-independent phase retardation as a function of voltage over the operative voltage range for light received from the light source without concomitant intensity change as a function of voltage.

8. An optical device comprising:
   a light source outputting light of wavelength or wavelength range greater than one micron;
   an optical cell arranged to receive light from the light source, the optical cell containing a polymer-stabilized liquid crystal material including a substantially randomly oriented short-pitch cholesteric liquid crystal material having a pitch of less than 500 nm stabilized by a polymer material wherein the short-pitch cholesteric liquid crystal material is arranged as domains having an average size of about one micron in the matrix of polymer material, the optical cell including electrodes for selectively applying a voltage across the polymer-stabilized liquid crystal material; and
   a voltage source arranged to apply voltage to the electrodes over an operative voltage range wherein the optical cell provides polarization-independent phase retardation as a function of voltage over the operative voltage range, the operative voltage range being not sufficient to switch the optical cell into a homeotropic state, the randomly oriented short-pitch cholesteric liquid crystal material remaining randomly oriented over the operative voltage range.

9. The optical device as set forth in claim 8, wherein (i) a concentration of the polymer material in the polymer-stabilized liquid crystal material and (ii) a highly twisted structure of the randomly oriented short-pitch cholesteric liquid crystal material independently or cooperatively cause the optical medium to interact with light at least at a selected wavelength in a substantially polarization-independent manner.

10. The optical device as set forth in claim 8, wherein the polymer material is less than about 10 wt-% of the polymer-stabilized liquid crystal material.

11. The optical device as set forth in claim 8, wherein the short-pitch cholesteric liquid crystal material comprises:
    a nematic liquid crystal material; and
    a chiral dopant dispersed in the nematic liquid crystal material.

12. The optical device as set forth in claim 8, further comprising:
    a laser dye doping said polymer-stabilized liquid crystalline optical medium such that said polymer-stabilized liquid crystalline optical medium is a gain medium suitable for use in a lasing device.

13. An optical device comprising:
   a light source;
   an optical cell arranged to receive light from the light source, the optical cell containing a polymer-stabilized liquid crystal material including a substantially randomly oriented short-pitch cholesteric liquid crystal material having a pitch of less than 500 nm arranged as domains and stabilized by a polymer material wherein (i) a concentration of the polymer material in the polymer-stabilized liquid crystal material and (ii) a highly twisted structure of the randomly oriented short-pitch cholesteric liquid crystal material cause the polymer-stabilized liquid crystal material to produce a substantially polarization-independent phase retardation of at least light received from the light source, the optical cell including electrodes for selectively applying a voltage across the polymer-stabilized liquid crystal material, wherein the liquid crystal material domains have a small average size as compared with the wavelength or wavelength range of light received from the light source;
   a voltage source arranged to apply voltage to the electrodes over an operative voltage range, wherein the optical cell provides polarization-independent phase retardation as a function of voltage over the operative voltage range, the operative voltage range being not sufficient to switch the optical cell into a homeotropic state light, the randomly oriented short-pitch cholesteric liquid crystal material remaining randomly oriented over the operative voltage range.

14. The optical device as set forth in claim 13, wherein the optical cell defines a phase modulator providing a change in phase retardation of at least $0.5\pi$ corresponding to a change in applied voltage of less than 10 volts/micron.

15. The optical device as set forth in claim 14, wherein the polymer material is less than about 10 wt-% of the polymer-stabilized liquid crystal material.

16. The optical device as set forth in claim 13, wherein the optical cell is a reflective optical cell, a phase of the light reflected by the optical cell being selectively retarded by the polymer-stabilized liquid crystal material based on the voltage applied via the electrodes.

17. The optical device as set forth in claim 13, wherein the optical cell is a transmission optical cell, a phase of light transmitted through the optical cell being selectively retarded by the polymer-stabilized liquid crystal material based on the voltage applied via the electrodes.

18. The optical device as set forth in claim 13, wherein at least one of the electrodes of the optical cell is an addressable electrode and the voltage source is a multi-channel voltage source configured to apply voltage across the polymer-stabilized liquid crystal material that is spatially variable over a principal face of the optical cell to effectuate a wavefront correction.

19. The optical device as set forth in claim 18, further comprising:
   a wavefront analyzer arranged to measure a wavefront of a light beam input to determine a wavefront error and causing the optical cell to correct the determined wavefront error.

20. The optical device as set forth in claim 13, wherein the polymer material is less than about 10 wt-% of the polymer-stabilized liquid crystal material.

* * * * *